(12) United States Patent
Watts

(10) Patent No.: US 8,181,998 B2
(45) Date of Patent: May 22, 2012

(54) THREADED PIPE CONNECTION

(75) Inventor: John Watts, Austin, TX (US)

(73) Assignee: Beverly Watts Ramos, Austin, TX (US)

( * ) Notice: Subject to any disclaimer, the term of this patent is extended or adjusted under 35 U.S.C. 154(b) by 290 days.

(21) Appl. No.: 12/087,762

(22) PCT Filed: Jan. 17, 2007

(86) PCT No.: PCT/US2007/001154
§ 371 (c)(1),
(2), (4) Date: Jul. 15, 2008

(87) PCT Pub. No.: WO2007/089427
PCT Pub. Date: Aug. 9, 2007

(65) Prior Publication Data
US 2010/0045033 A1    Feb. 25, 2010

(51) Int. Cl.
*F16L 25/00* (2006.01)
(52) U.S. Cl. ........................................ 285/334; 285/333
(58) Field of Classification Search .................. 285/333, 285/334
See application file for complete search history.

(56) References Cited

U.S. PATENT DOCUMENTS

| | | | | |
|---|---|---|---|---|
| 2,183,644 A * | 12/1939 | Frame | ........................... | 285/333 |
| 2,587,544 A * | 2/1952 | Sneddon | ........................ | 285/333 |
| 3,042,429 A * | 7/1962 | Kelso | ............................ | 285/334 |
| 3,050,318 A * | 8/1962 | Van Der Wissel | ............ | 285/334 |
| 3,079,181 A * | 2/1963 | Van Der Wissel | ............ | 285/333 |
| 4,113,290 A * | 9/1978 | Miida | ........................... | 285/334 |
| 4,121,862 A * | 10/1978 | Greer | ........................... | 285/333 |
| 4,346,920 A * | 8/1982 | Dailey | .......................... | 285/334 |
| 4,588,213 A * | 5/1986 | Bollfrass et al. | .............. | 285/333 |
| 4,629,222 A * | 12/1986 | Dearden et al. | ............... | 285/334 |
| 4,629,223 A * | 12/1986 | Dearden et al. | ............... | 285/334 |
| 4,770,448 A * | 9/1988 | Strickland et al. | ............ | 285/333 |
| 4,892,337 A * | 1/1990 | Gunderson et al. | ........... | 285/333 |
| 5,360,239 A * | 11/1994 | Klementich | ................... | 285/334 |
| 5,454,605 A * | 10/1995 | Mott | ............................ | 285/333 |
| 5,908,212 A * | 6/1999 | Smith et al. | .................... | 285/333 |
| 6,155,613 A * | 12/2000 | Quadflieg et al. | ............. | 285/334 |
| 6,481,760 B1 * | 11/2002 | Noel et al. | ..................... | 285/334 |
| 7,575,255 B2 * | 8/2009 | Reynolds et al. | ............. | 285/333 |

* cited by examiner

*Primary Examiner* — David E Bochna

(57) ABSTRACT

Conventional box and pin threads are machined with equal thread pitches and radial interference so when they are assembled, the pin elongates and the box contracts axially, causing a mismatch in the thread pitch which in turn, reduces sealing and best load transfer capacities between mating threads. This invention teaches how to improve both sealing and load transfer capacities.

27 Claims, 3 Drawing Sheets

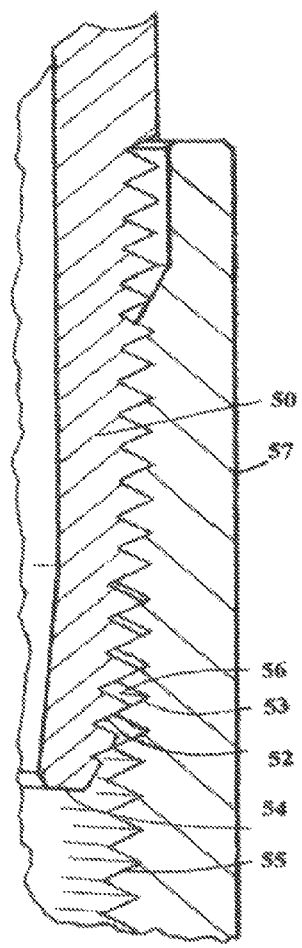
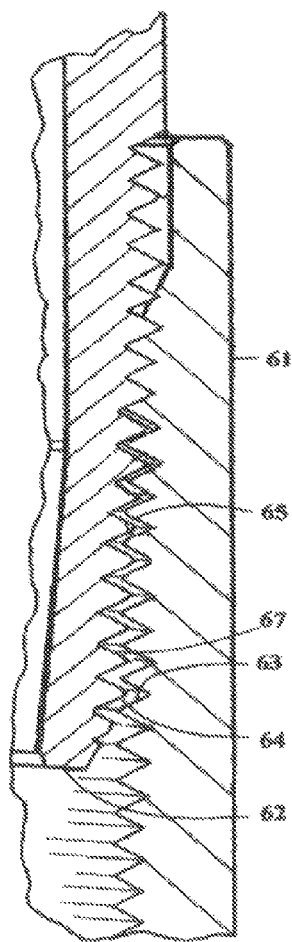
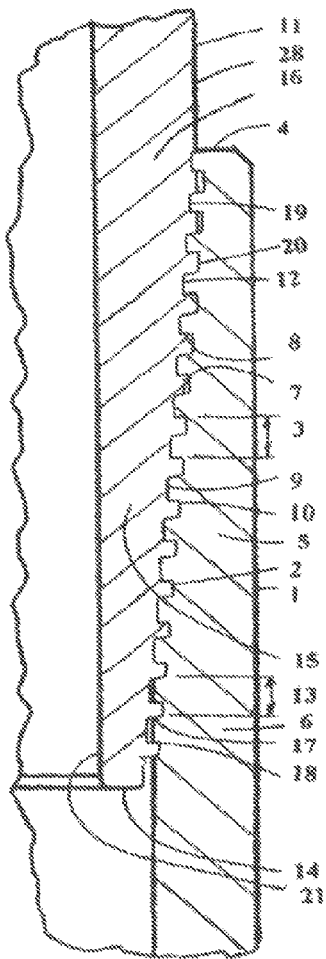
FIG. 1
PRIOR ART
FIG. 2
PRIOR ART
FIG. 3

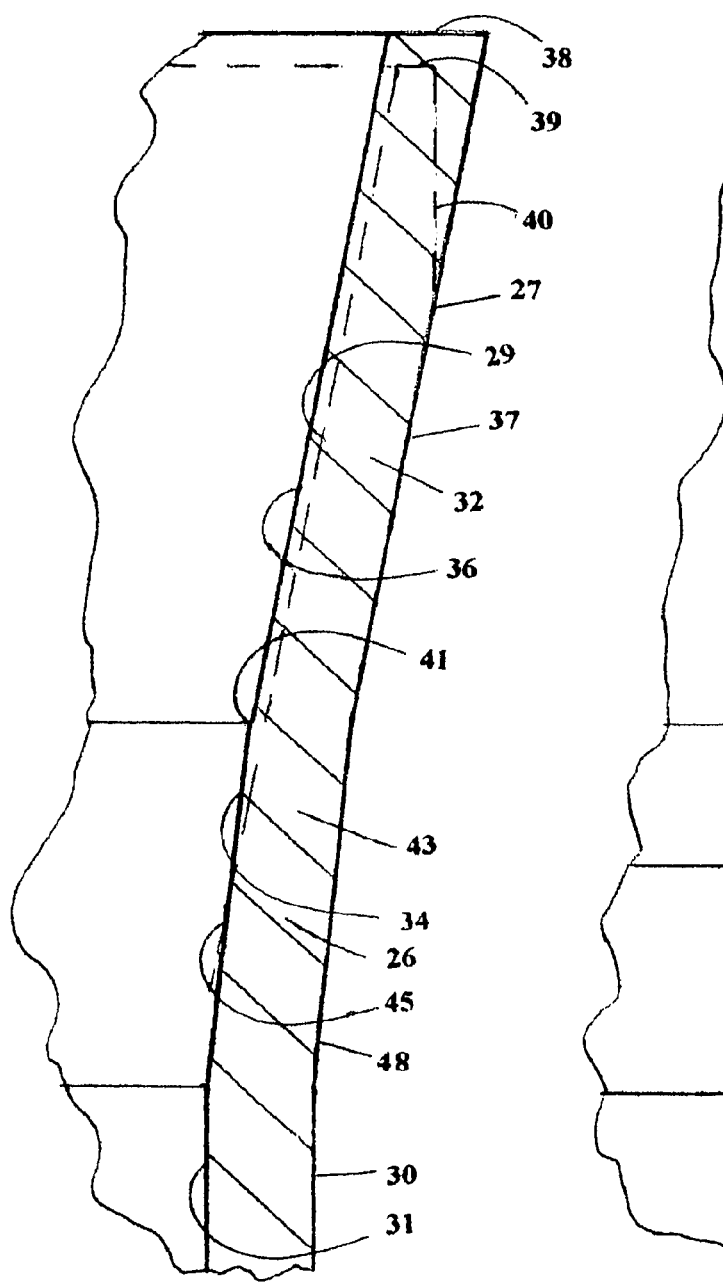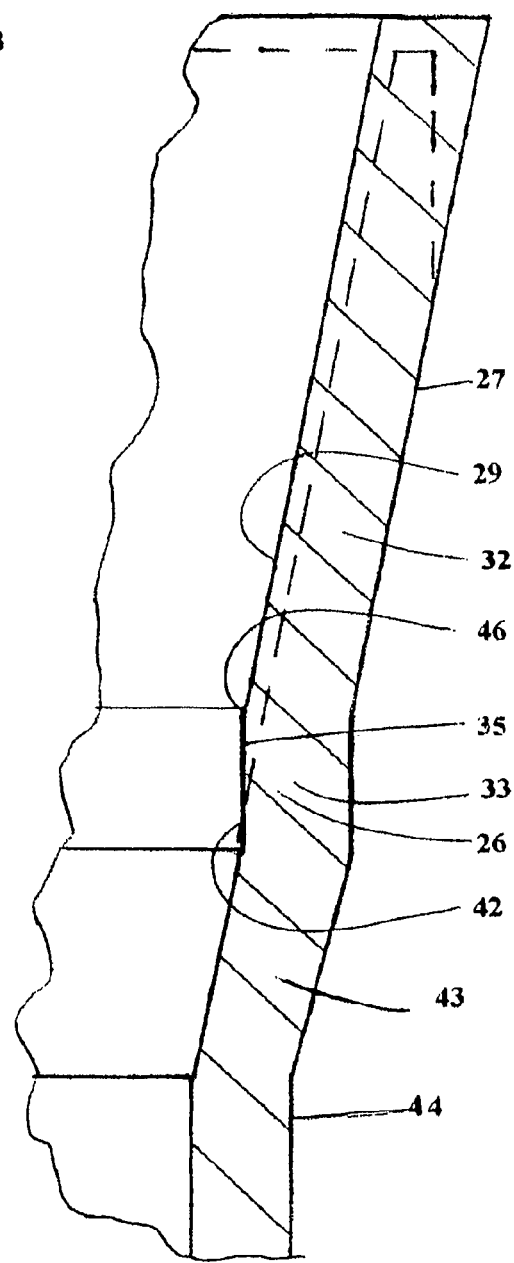
FIG. 4  FIG. 5

THREADED PIPE CONNECTION

TECHNICAL FIELD

My invention is a high strength threaded pipe connection with excellent sealing characteristics for use in virtually all industries.

BACKGROUND ART

Threaded pipe connections that connect joints of pipe together and seal between them to prevent leakage of fluids from the pipe, have been used for hundreds of years with the external thread lead being made as close as then possible to the internal thread lead. Most pipe connections threads in use today are tapered threads, so the interface pressure between the threads will increase with each turn of makeup to a degree of tightness deemed sufficient to prevent loosening of the connection and leakage of fluid from the pipe. If interface pressure is too low the threads will loosen and leak but if it is too high, the pin or the box may be yielded plastically such that its operability is questionable. As pipe sizes and fluid pressures increased, pipe materials graduated from bamboo, to wood, to brass, to iron, to steel and occasionally to high-strength, high-temperature alloys as necessary to maintain strength and sealability which in turn, required an increase of radial thread interference and interface pressures between the mating threads. For purposes of this application: A thread flank angle is measured in a plane coincident with the pipe axis, in the gap between the flank surface and a plane perpendicular to the pipe axis; A pin is a tubular member having external threads; A box is a tubular member having mating internal threads for assembly with the pin; One thread turn means one revolution of a thread; Lead means the axial length a thread advances in one thread turn; A negative flank means a flank that faces more toward the root; A positive flank means a flank that faces more toward the crest; A hook-type thread is a thread with a negative flank angle; "My invention" is the subject of the present application.

Historically, pin threads have been made with the same taper and lead as the mating box threads until Watts U.S. Pat. No. 4,974,882 taught that the pin thread should be made with a slower taper than the box thread so that upon assembly, the maximum radial interference between mating threads occurs at the small diameter end of thread engagement which facilitates assembly of the pin with the box, improves thread strength and assists sealability.

Sivley U.S. Pat. No. 6,976,711 teaches changing of the stab flank lead and/or the load flank lead of mating box and pin threads such that the "stab flank lead and the load flank lead become equal to the average lead at a selected distance from the end of the threads" and "the load flank lead and the stab flank lead are different from each other at least part of the thread length" but nowhere does '711 teach changing the pin thread lead relative to the box thread lead, nor does it mention any thread lead mismatch that is created during assembly of pin with box threads due to Poison's Ratio. In view of Invitroge v. Clontech Lab nos. 04-1039-1040 patent, '711 is not prior art because it neither mentioned the problem nor the solutions taught herein. To applicant's best knowledge and belief, there have been no compensations taught to insure intimate contact between mating threads or to offset mating thread lead mismatch caused by radial interference.

To illustrate some of the problems solved by my invention, Type 1 Failures depicted in FIG. 1 often occur in prior art such as API 5B 8-Round pipe threads when assembly of box (57) with pin (50) compresses the pin radially causing it to elongate axially, and also expands the box radially causing it to shorten axially, the difference in lengths forcing pin stab flank (52) against thirty degree box stab flank (53) whereupon the radial force vector of the axial force moves pin face (54) inwardly and out of engagement with mating box thread (55) which weakens the connection because fewer threads are then in contact to resist axial loads, and it also opens helical leak path (56) between the mating threads.

FIG. 2 depicts a Type 2 failure of conventional threads such as API 5B 8rd pipe threads after being subjected to external fluid pressure acting around box (61), external fluid pressure increasing the compressive hoop stress in pin face (62) due to thread interference upon assembly. The combination of forces plastically yield the pin-end, causing loss of contact between box thread (63) and mating pin thread (64) which upon release of the external pressure, leaves open both axial and helical leak path (67) which prevents the threads ability to mate and seal against internal fluid pressure after the still elastic box has returned to its original diameter and the yielded end at the pin face has not because the compressive hoop stress is greatest at the pin face. Type 1 and Type 2 failures tend to occur in connections where pin thickness near the pin face is less than adjacent box wall thickness.

FIG. 6 depicts first contact between conventional threads such as API 5B 8Rd threads when stabbed at the rotational position that effects the least pressure angle (68) for that thread form, the pressure angle being formed between pipe axis (25) and force vector (46) that passes through mutual contact point (93), the least possible pressure angle being equal to stab flank angle (81). Such threads have pin stab flank (70), crest (74), box stab flank (71) formed on stab flank angle (81). FIG. 7 depicts first contact between pin and box threads when stabbed at the rotational position that effects very high pressure angle (79) which may cause a Type 3 Failure, as pin crest (74) contacts box stab crest (77), the failure being caused by too great a pressure angle (79) which generates too great a bearing stress between the mating stab flanks at mutual tangent point (82) in the direction depicted by force vector (76). Pin stab surfaces include surface (74) formed intermediate pin stab flank (70) and pin thread crest (74). Box stab surfaces include surface (75) formed intermediate box stab flank (71) and box thread crest (77). Surfaces (74, 75) may be formed arcuate, conically or otherwise as is best to prevent handling damage to sharp corners that would otherwise be positioned there, as is well known in the art. API Buttress and other thread forms having cylindrical crests with radii between the flank and crest are affected likewise. After a pin is stabbed into a box, it is typically rotated a partial turn opposite the direction of makeup in an attempt to attain the rotational position of minimum pressure angle for that thread design as depicted in FIG. 6. Depending on the rotational position between the box and pin thread when stabbed, the pressure angle may vary from, a minimum equal to flank angle (81) to almost 90 degrees as depicted in FIG. 7 at (79). An increase of the pressure angle increases the unit bearing stress between the threads as at mutual tangent point (82), which increases torque required to rotate the pin into the box against the friction force caused by the weight of pipe that is being stabbed. As the pressure angle increases the vector force increases, and depending on the weight of pipe being stabbed, the friction force can become so great that the threads gall, cross-thread and/or lock-up, which prevents proper assembly of the pin with the box. The smaller the crest radius and the faster the reverse rotation, the more likely that pipe inertia during reverse rotation will cause the pin to pass the rotational point of failure before gravity lowers the pin one thread turn to gain best position, however, when past the best position depicted in FIG. 6, the danger of a Type 3 failure is again imminent within less than a turn.

Swaged box connections used over the years have typically been rated at 65% of the pipe strength and a few have nervously been rated toward 75% of the pipe body strength when formed on certain thick-wall pipes. They could claim no higher ratings because thread engagement did not extend completely through the box wall, but stopped in a swaged portion formed on the same taper as the threads, which reduced the critical area at the neck of the box to no more than 75% of the pipe wall cross-sectional area if the threads were perfectly positioned both axially and radially with regard to the swage wall. However, such perfect positioning cannot be maintained during production threading, so the resulting efficiencies of prior art swaged connections have been typically limited to less than 75% of pipe strength.

API Reports state that ninety to ninety-five percent of down-hole well problems are caused by leaking pipe threads and API records are replete with extensive experiments that attempted to learn why pipe threads leak in service. In error, API long assumed that all API 5B pipe threads coated with API 5A2 thread dope sealed, as confirmed by the fact that 5B thread dimensions and tolerances and API 5A2 thread dopes were not substantially changed since they were adopted in 1939, until after the 1995 issue of Watts' U.S. Pat. No. 5,427, 418 that taught solution. Currently, no prior art has been found by applicant that teaches: Upon assembly, mating threads formed with equal axial lead lengths are subject to Types 1, 2 and 3 Failures, and no solutions have been taught to solve the problems, so the problem identifications and solutions in this application are presented to advance the art.

DISCLOSURE OF INVENTION

My invention teaches how to prevent Type 1, Type 2 and Type 3 failures, and also teaches a new swage configuration that substantially advances the art. During assembly of a threaded pipe connection, the pin is screwed into the box which generates an increasing radial interference between the mating threads, which reduces the pin diameter and increases the box diameter and in accord with Poisons Ratio, the diameter changes elongates the pin axially and shortens the box axially, causing a lead mismatch between box and pin threads originally formed with equal lead. The degree of mismatch depends on such as thread diameter, thread lead, radial interference and on Poisons ratio for the pipe material.

Type 1 Failures may be avoided by forming pin threads to have a shorter lead than the box threads such that during assembly, the pin elongates axially and the box contracts axially so that when fully assembled, pin threads have substantially the same lead as their mating box threads to better fit pin and box thread profiles which increases structural strength of the connection and improves ability of the threads to seal higher pressures and lighter fluids. Either the pin or box threads may be formed with constant lead and the other formed with an adjusted lead to effect the improvements just described, the pin lead being shorter than the box lead. For a given amount of diametrical interference per unit of diameter between mating threads, the adjustment per unit axial length will equal the unit diametrical interference multiplied by Poisons Ratio. As an example, if pipe threads having a ten inch nominal diameter and a Poisons Ratio of 0.28 are to be assembled so as to produce 0.030" diametrical interference, then the unit diametrical interference=0.030"/10"=0.003 inch per inch of diameter, and the length adjustment between a mating pin and box=0.003"×0.28=0.00084 inches per inch of axial length. Then, when threads are formed on a nominal lead of ¼" the lead adjustment=0.00084/4=0.00021" which may all be applied to one of the mating threads or it may be divided between them such as, the box lead may be lengthened 0.0007" and the pin lead may be shortened 0.00014". My invention may be practiced with varying degrees of accuracy, depending on service requirements for the threads and on cost restraints.

Should there be a substantial difference in radial unit interference along the axis of the mating threads as occurs between box and pin threads formed on like tapers and/or when pin threads have a slower taper than the box threads, then a variable lead adjustment may be preferred, depending on the accuracy of fit between the mating threads that a particular service may require. Such a fit is ideal if the lead varies with each thread turn, but the lead may vary in steps of several thread turns that approximate the ideal lead change per turn when the most precise fit is not required.

A connection in accord with my invention can also prevent Type 2 failures. I prefer the use of hook-type threads with an additional lead adjustment between the pin face and mid-length, that is superimposed on the lead adjustment described above, to provide an axial tension in that portion of the pin when assembled, so as to lock mating threads together alone or in combination with radial interface pressure that may exist between the mating threads. It is well known that a negative load flank of a hook thread opposes tendency for a pin thread to "jump out" of the box thread when under high tension loading of the connection, however, it has not been taught heretofore that a pin thread lead made shorter than the mating box thread lead as described above, can lock mating hook threads together independent of radial thread interference. To do so, I effect tension in a pin between its face and mid-section to increase both radial and axial interface pressure between the mating threads. API Bulletin 5C3 (4.2) teaches "the internal leak resistance pressure being equal to the interface pressure" but it relies only on the interface pressure developed by hoop compression of the pin and is silent regarding any other method of creating or sustaining interface pressure. The lead length adjustment between box and pin threads required by a given service to induce load on a negative load flank angle sufficient to hold pin-end threads in sealing engagement with their mating box threads without help from radial thread interference, may be calculated for various flank angles and diameters under any combination of rated internal and external fluid pressure and/or mechanical loadings, but the principals taught herein are constant. Calculations and tests indicate that load flanks made parallel to the stab flanks are operable, however, it should be understood that the use of other combinations of flank angles are within the scope of my invention. Finite Element Analysis (FEA) has proven that a swaged connection in accord with my invention is serviceable to at least, 95% of the pipe strength and pressure tests prove that the threads will seal up to the structural pressure capacity of the connection wall thickness.

The interface pressure between box and pin threads caused by radial thread interference during assembly is typically greatest at mid-length of the engaged threads where the thickest combination of box and pin walls are normally located, so when this feature of pin tension is used, I prefer that the mid-length threads not have this additional lead adjustment to minimize box and pin mid-section axial stress when assembled, so they will precisely mate and anchor the pin against relative axial movement with the box, while maintaining tension in the thin end of the pin and preventing loosening of the thread fit. Thus, the pin threads between the pin face and pin mid-section are locked together with their mating box threads by the tension acting on the hook thread negative angle load flank while in the other direction, the threads are anchored by mating mid-length threads under highest interface pressure that maintains intimate thread contact even if the pin near the pin face becomes plastically yielded in hoop compression as by external fluid pressure, because the mating pin-end threads will still be in intimate sealing contact when internal fluid pressure is later applied. This additional lead adjustment may be added to all threads, to threads between the pin face and mid-section only, or it may be added to only some of the threads nearest the pin face if lesser operating loads are expected. Ideally but not necessarily, I prefer: the thread lead adjustment to be greatest at the pin face and decrease toward the pin neck such that upon assembly, all mating threads are substantially equal in lead, with the pin threads being in tension between the pin face and mid-length. For some services, it may be desirable for pin threads between mid-length and pin neck to be in slight compression against their load flanks so as to assure sealing against external fluid pressures and/or corrosion. However, other thread lead adjustment patterns may be used without departing from the spirit of my invention. After assembly, fluid pressures and service loads may cause further contraction and/or expansion of the assembled threads, but the original assembled lead relationship will be constant because pin and box will expand and contract the same amount together. Therefore, such connections may be used on expandable pipe strings because as the box and pin threads expand or contract together, the diametrical interference stays constant, so the desired difference in axial lead stays constant.

The radial width of a pipe wall required to form a cylindrical thread is less than the radial width of a pipe wall required to form a tapered thread having the same thread depth, so applications of my invention to such as thin wall pipe, can maintain sealing contact of mating threads with or without radial thread interference, sufficiently to maintain intimate thread fit and also, to hold the threads in the desired assembled sealing position against mechanical forces.

My invention may be practiced with various thread forms having positive or negative flank angles but I prefer the use of positive low angle stab flanks and negative low angle load flanks, however, my invention may also be used with non-hook-type threads such as API 5B 8-round threads to prevent Type 1, Type 2 and/or Type 3 failures. Various hook-type thread forms and wedgethreads may be used to practice my invention but when high performance properties are required, I prefer open wedgethreads in accord with Watts' U.S. Pat. Nos. 6,578,880 and/or 6,682,101. How to effect and maintain precise intimate contact between mating pipe threads with or without radial thread interference is now clear, such that reliable pipe threads can be provided for any industrial or domestic service to increase safety, reduce costs, and better protect the environment against dangerous leakage of harmful fluids and catastrophic mechanical connector failures that are often caused by conventional pipe threads.

Another feature of my invention, that may be used in combination with other features disclosed herein, to improve connection efficiency without use of double-box couplings or pipe-end upsets, is to provide a swaged box having a critical area of the box neck selectively up to 100% of the pipe body cross-sectional area, wherein the mating thread engagement extends substantially from the outer diameter of the pin, to an inner surface of the swage. Thread run-out at the pin neck has long been used in pipe threads such as API Buttress Connections, but thread run-out within a swaged box has not been taught, to applicant's best knowledge and belief. A box swage in accord with my invention comprises an upper tapered portion that tapers inwardly in the direction from box face, down to a lower tapered portion formed along a slower taper that extends inwardly toward the pipe body. Alternately, the box swage may comprise an intermediate portion positioned axially between the upper and lower tapered portions and in such a case, the intermediate portion may be formed cylindrically or on a slower taper than the upper and lower portions. In either case, to receive a mating pin such as pin (11) depicted in FIG. 3, the box threads are formed within the upper portion and run-out within the inner swaged diameter of the adjacent portion, be it the lower portion or the intermediate portion. Thus, without need for a pipe upset to provide a box wall thicker than the original pipe wall thickness, a critical box wall cross-sectional area, selectively as large as the pipe cross-sectional area, is provided to form a connection that may be as strong as the pipe body. I prefer that the box inner swage diameter at the box thread run-out is made large enough to provide sufficient radial width around the pipe inside diameter, to position pin face (14) which is wide enough to support pin threads and withstand handling forces during installation. For services that require pipe connections having less than 100% of the pipe strength, a connection in accord with my invention may be provided to have strength between 75% and 100% of the pipe body, because box strengths lower than 65% can be formed within plain end pipe.

An additional feature of my invention assures proper stab and makeup of pin and box threads with minimum of time and effort without damage to the threads, by limiting the pressure angle that can occur between mating stab flanks of the threads being assembled, to be less than 80 degrees as depicted in FIG. 8, however, I prefer the pressure angle to be no more than 60 degrees, the minimum pressure angle being equal to whatever stab flank angle is used. The pressure angle is the acute angle between the pipe axis and the force line drawn through the mutual contact point between the threads, perpendicular to the line of tangency between pin and box threads when at stab position. The force line defines the instantaneous position and direction of the resisting force transmitted between mating stab flanks typically generated by weight of pipe being stabbed.

BRIEF DESCRIPTION OF DRAWINGS

FIG. 1: Fragmentary section of API 5B threads depicting thread mismatch caused by assembly.

FIG. 2: Fragmentary section of an API 5B connection depicting thread separation during service.

FIG. 3: Fragmentary section of a preferred embodiment of a box and pin in accord my invention.

FIG. 4: Fragmentary section of a box swage in accord with my invention.

FIG. 5: Fragmentary section of an alternate box swage in accord with my invention.

MODES FOR CARRYING OUT THE INVENTION

Figures 6, 7, 8:
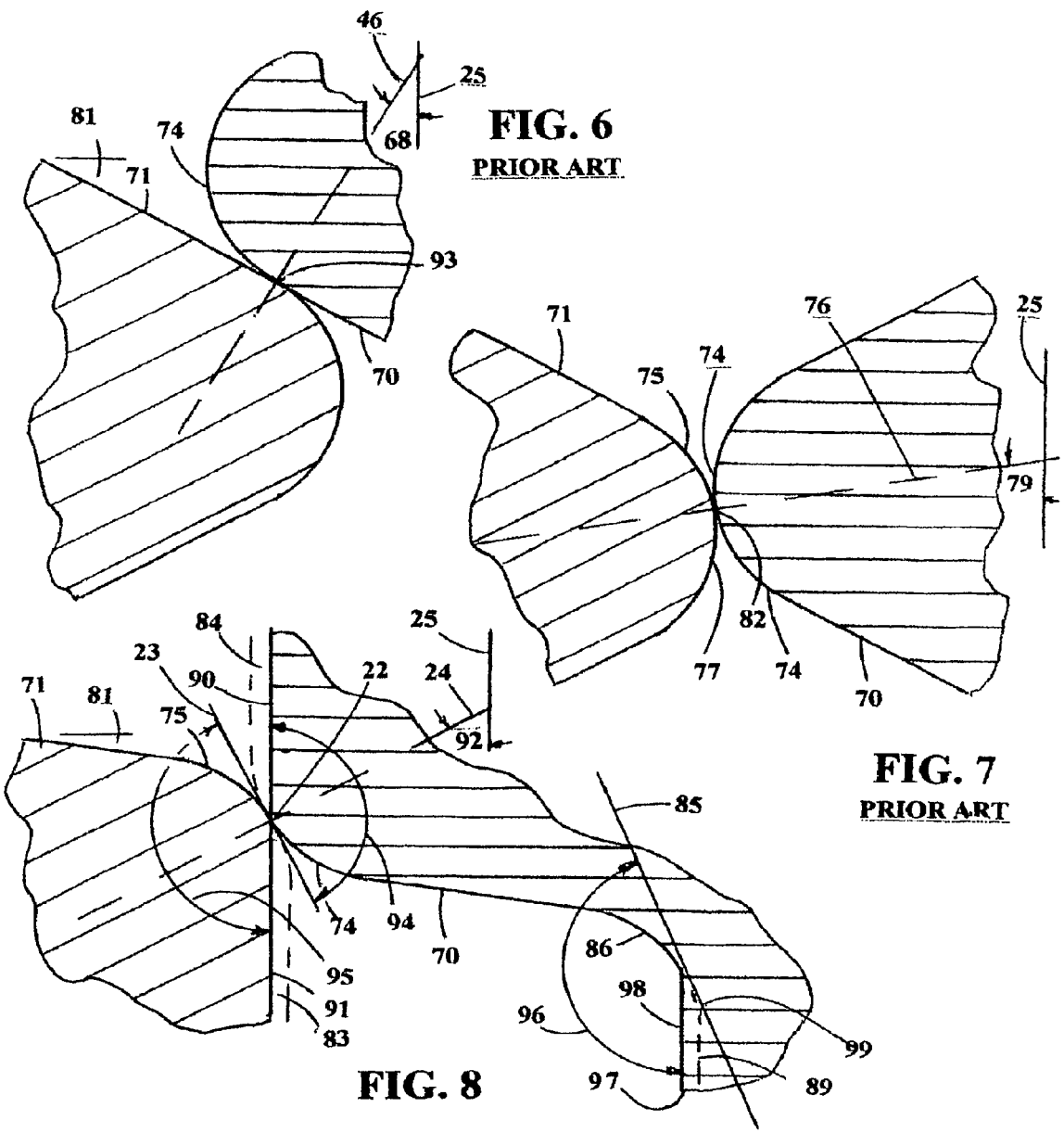
FIG. 6: Fragmentary section depicting a low pressure angle between mating stab flanks.
FIG. 7: Fragmentary section depicting a high pressure angle between mating stab flanks.
FIG. 8: Fragmentary section of a pressure angle in accord with my invention.

A preferred embodiment of my invention disclosed in FIG. 3 depicts: Box (1) having internal thread (2) of constant lead (3); box face (4); box mid-length (5); box neck (6); box positive stab flank (7); box negative load flank (8); box cylindrical crest (9) and box root (10). The box is assembled with pin (11) formed on pipe (28), the pin having: pin thread (12) formed with variable axial lead (13); pin face (14); pin bore (21); pin mid-length (15); pin neck (16); pin positive stab flank (17); pin negative load flank (18); pin cylindrical crest (19) and pin root (20). The lead of the pin thread at the pin face is formed shorter than the lead of its mating box thread, the pin thread lead increasing each turn in the direction from the pin face to the pin neck such that as thread interference increases during assembly, the pin length increases and the box length shortens in accord with Poisons Ratio, until all mating lead lengths become substantially equal at thread makeup position.

When it is desired to increase or better maintain thread interface pressure near the pin end, then axial tension may be introduced in the pin between the pin face and pin mid-length when assembled with the box, by further reducing the pin thread lead within that length. The thickest combination of box and pin walls is typically at mid-length of the engaged threads and the thickest walls in turn, generate the highest interface pressure between the mating threads, so I prefer the stab flank angle to be small enough for the mid-length threads to firmly anchor the pin against axial movement relative to the box so as to seal fluid pressure and prevent loosening of the threads. The lead length adjustment between box and pin threads required to induce load on a negative load flank angle sufficient to hold pin-end threads in sealing engagement with their mating box threads without help from radial thread interference, may be calculated for various flank angle and diameter combinations, but the principle taught herein is constant. The axial tension pre-load in the pin between the pin face and pin mid-length is of a magnitude to maintain sealing contact of the mating threads when they are expanded elastically or plastically, or contracted by external fluid pressure. My invention allows a lower hoop compression in the pin near the pin face than is required without it, in order to seal against fluxuating: high pressure and/or high temperature internal or external fluids within ratings, simultaneously or successively. Selection of a suitable positive stab flank angle must consider at least: service loads; the pipe size and wall thicknesses; the pipe material and the thread interference. The selection of negative load flank angles large enough to keep threads engaged under any combination of rated internal and external fluid pressure and mechanical loadings is required to practice my invention, and calculations and tests indicate that negative seven degree load flanks made parallel to positive seven degrees stab flanks are sufficient, however, it should be understood that use of other flank angle combinations are within the scope of my invention.

A preferred embodiment of the box swage feature depicted in FIG. 4 includes pipe (44); upper swage portion (32) of box (27) having end (38), inner conical surface (36), and outer conical surface (37); lower swaged portion (43) having inner conical surface (34). Swage end (38) is machined to form box face (39) and the outermost diameter of the box is machined to diameter (40) large enough to support tapered box threads (29) and provide an end box wall strength sufficient for handling purposes. Box threads extend from box face (39) to their run-out (45) from inner surface (34) within portion (43) past juncture diameter (41) such that critical area (26) formed between run-out (45) and outer surface (48) of portion (43) can be as large as the pipe body cross-section area (30). It is now clear that box threads can be machined within the swage so as to provide critical areas of the box and pin selectively as large as the pipe cross-section area as required to make a full-strength connection with a swaged box. The ability of lower portion (43) to contain fluid pressure may seem slightly less than the pipe body ability because it has a smaller "Wall Thickness to Outer Diameter Ratio" than the pipe, after being swaged outwardly from the original pipe size, however: portion (43) gains unit strength as it is work-hardened during swaging, it becomes more constant in thickness as it is being swaged and also, it is short enough to be supported above and below by adjacent lower stressed pipe walls; and because the pipe API fluid pressure rating calculation assumes a pipe wall only seven-eights of the pipe nominal wall. Therefore, no load de-rating should be required of the box relative to the pipe, if the swage inside diameter is no more than 14% larger than pipe inside diameter. Juncture diameter (41) is formed large enough to allow for sufficient radial width around the pipe inner diameter (31) to position pin face (14).

An alternate box swage configuration is shown in FIG. 5 wherein intermediate swage portion (33) is joined to upper portion (32) at inner junction diameter (46) and to lower portion (43), such that box thread (29) within box (27) will run-out at (42) at inner surface (35) of the intermediate portion with critical area (26) there between, the intermediate portion being formed cylindrically or having a slower taper than portions (32, 43). With use of portion (33) the upper and lower portions may both be on the same taper as the box thread, with the intermediate portion being of sufficient axial length to allow a thread re-cut should the box thread become damaged. Although threads depicted herein have been proven to seal against high pressure gas, a pin-end lip seal per my U.S. Pat. No. 2,766,829 often called a metal-to metal seal, may be added to connections in accord with my invention, should user specifications require it.

FIG. 8 depicts a thread form in accord with my invention that modifies a conventional thread to prevent the possibility of an extreme pressure angle depicted in FIG. 7. Pin stab flank (70) is depicted in FIG. 8 as it makes first contact with box stab flank (71) at mutual contact point (22) when the pin is stabbed into the box, portion (84) of a conventional pin crest having been removed to form pin crest (90), and portion (83) of a conventional box crest having been removed to form box crest (91) in accord with my invention, so as to limit pressure angle (92) formed between pipe axis and force vector (24) to be no more than 60 degrees which is my preferred pressure angle, although it may be as large as 80 degrees for light duty threads, or as small as the thread stab flank angle. Surfaces (74,75) are depicted as being arcuate but may be formed otherwise such as conically, or in combinations such as arcuate surfaces extending from the stab flank, to be tangent with conical surfaces that abut crests (90, 91). Obtuse angle (94) formed between pin crest (90) and mutual tangent line (23) and obtuse angle (95), formed between box crest (91) and mutual tangent line (23), are each large enough to effectively resist mechanical damage at juncture of the surfaces. Obtuse angle (96) formed between pin root (98) and line (85) drawn tangent to root radius (86) through its juncture with root (98) is large enough to reduce stress concentration at the pin root to an acceptable magnitude with like configurations at the box root. When minimum gaps between crests and roots are not required for purposes such as to effect a very high pressure seal, then roots may be formed tangent with the radii as at (99) which would leave gap (97) between box crest (91) and alternate pin root (89). It is now clear how the pressure angle can be limited to prevent excessive bearing stresses between threads while the pin is being stabbed into the box, to provide a quick and easy makeup without damage and also, to reduce root stress concentration.

INDUSTRIAL APPLICABILITY

All modes of my invention may be used down-hole in oil and gas fields on tubing, casing, drive-pipe, cassions, pipelines, risers, tendons, and/or tie-backs because the pipe connection will seal dry gas and withstand because the connection may be rated the same as pipe both for sealing fluid pressures and withstanding mechanical loads. Threaded pipe connections now used in refineries, process plants, power plants, pipelines and such are been restricted to small sizes and low fluid pressures because they loosen, leak and rupture, but connections per my invention do not, so they may be used virtually anywhere pipe is used.

I claim:

1. A pipe connection having a box (1) with an internal thread (2) formed with a box thread lead (3) for mating with a pin (11) having an external thread (12) formed with a pin thread lead (13), the mating threads being sized for diametrical interference when assembled together, the pipe material having a Poisson's Ratio, comprising:

The pin thread lead being made shorter than the box thread lead to substantially offset axial elongation of the pin thread and axial contraction of the box thread that occur in accord with Poisson's Ratio during assembly of the pin with the box, such that the mating thread leads are substantially equal when assembled;

The difference in leads before assembly being substantially equal to the diametrical interference of the threads, divided by the mean thread diameter, multiplied by Poisson's Ratio, and divided by the number of threads per unit length.

2. The pipe connection of claim 1 having a box a load flank (8), a pin face (14), and a pin load flank (18) a pin mid-length (15), further comprising:

The pin thread lead near the pin face being formed shorter than the mating box thread lead so as to effect a desired axial tension load in the pin between the pin face and pin mid-length upon assembly of the pin with the box;

The tension load being sufficient to preload and maintain the box load flanks against mating pin load flanks in sealing contact, against rated service loads.

3. The pipe connection of claim 2 further comprising:

The axial tension load being anchored at mid-length by mating stab flanks;

The axial tension load being anchored toward the pin face by mating load flanks sufficiently to prevent relative movement between the box and pin.

4. A pipe connection having a box (27) swaged outwardly on an end of the pipe (44), the box having a face (39) and an upper portion (32) formed with tapered box threads (29) for mating engagement with a thread (12) on a pin (11), having a pin face (14), the swage having a lower portion (43) an inner diameter (41) at the juncture of the upper portion with the lower portion; the box thread having a thread run-out (45) at an inner surface (34), at the inner diameter, comprising:

Engaged box and pin threads tapering inwardly from the box face; the inner diameter being sized to provide radial width around the pipe bore sufficient to position a pin face having enough width to support pin threads and to withstand service loads;

The lower portion being formed such that the engaged box and pin threads may extend substantially to the inner surface and thereby provide a swaged connection strength that is selectively, between 75% and 100% of the pipe strength.

5. A swaged box in accord with claim 4, having an intermediate swaged portion (33) being positioned between the upper and lower portions, the intermediate portion having an inner surface (35) and a thread run-out (42), further comprising:

The intermediate portion being formed with less taper than the upper portion such that engaged mating box and pin threads may extend to the thread run-out at the inner surface of the intermediate portion so as to provide a swaged connection strength, selectively between 75% and 100% of the pipe strength.

6. A threaded pipe connection having a pipe axis (25), a pin thread stab flank (70), a pin thread crest (90) and a pin intermediate surface (74) positioned between its flank and crest; the connection also having a box thread stab flank (71), a box thread crest (91), and a box intermediate surface (75) positioned between the box flank and crest, contact between the pin and the box threads when stabbed, being at a mutual contact point (22), on both box and pin intermediate surfaces, a tangent line (23) extending through the mutual contact point and a force vector (24) extending through the contact point perpendicular to the tangent line, a pressure angle (92) measured between the pipe axis and the force vector, comprising:

The threads being formed such that as the pin is being stabbed into the box, no pressure angle can be formed between box and pin intermediate surfaces that is greater than 75 degrees.

7. The pipe connection of claim 1 or 2 or 6 further comprising:

All box threads being formed with equal lead and at least some of the pin threads being formed with shorter leads than their mating box threads.

8. The pipe connection of claim 7, having a pin neck (16), further comprising:

Pin threads whose lead increases in the direction from the pin face toward the pin neck.

9. The connection of claim 1 or 2 or 6 further comprising:

All of the pin threads being formed with equal lead and at least some of the box threads being formed with a longer lead than the mating pin threads.

10. The connection of claim 9 further comprising:

At least some of the box threads increasing in lead in the direction from the box face toward the box neck.

11. The pipe connection of claim 1 or 2 or 6 further comprising:

The threads being formed cylindrically.

12. The pipe connection of claim 1 or 2 or 6 further comprising:

The box thread being formed on a taper and the pin thread being formed on a slower taper than the box thread taper.

13. The pipe connection of claim 1, 2 or 6 further comprising:

The threads having a negative load flank angle of sufficient magnitude to maintain sealing engagement of the mating threads against rated service loads.

14. The pipe connection of claim 1 or 2 or 6 further comprising:

The threads having load flanks formed on a negative angle of sufficient magnitude to exert radial force from axial tension loads sufficient to maintain interface sealing pressures both axially and radially between the mating threads, against rated service loads.

15. The connection of claim 14, further comprising:

The mating threads having radial interference upon assembly so as to effect interface pressures between the mating threads sufficient to maintain mating threads in sealing contact against all loads within connection ratings.

16. The pipe connection of claim 1 or 2 or 6 further comprising:

The threads being wedgethreads.

17. The pipe connection of claim 1 or 2 or 6 further comprising:

The threads having negative stab flanks.

18. The pipe connection of claim 1 or 2 or 6 further comprising:
The threads having positive stab flanks.

19. The pipe connection of claim 1 or 2 or 6 further comprising:
The threads having negative load flanks.

20. The pipe connection of claim 1 or 2 or 6 further comprising:
The threads having positive load flanks.

21. The connection of claim 1 or 2 or 6 further comprising:
The threads having load flanks formed perpendicular to the axis.

22. The connection of claim 1 or 2 or 6 further comprising:
The threads having stab flanks formed perpendicular to the axis.

23. The connection of claim 1 or 2 or 6 further comprising:
The threads having negative load flanks and negative stab flanks.

24. The connection of claim 1 or 2 or 6 having an upper box swage portion (32) tapering inwardly toward the pipe (30) and having an inner diameter (31) and formed with internal tapered threads (29), the swage having a lower portion (43) with an inner surface (34) formed with an inner-diameter (41) between the upper portion and the lower portion, a pin (28) and a pin face (14), further comprising:
The pin face width being sufficient to form threads around and withstand service stresses;
The inner diameter being sized sufficiently to allow the pin face to be positioned around the pipe inner diameter;
The lower portion being formed with less taper than the upper portion such that the box threads may engage mating pin threads at the pin outer diameter and at the inner surface of the lower portion and thereby provide a swaged connection having a strength, selectively, between 75% and 100% of the pipe strength.

25. The pipe connection of claim 24, further comprising:
An intermediate swaged portion (33) being formed axially between the upper and lower portions, the intermediate portion having an inner surface (35) formed with less taper than the upper or lower portion, such that the box threads run-out in the intermediate portion engaged with mating pin threads sufficiently to provide a swaged box strength selectively, between 75% and 100% of the pipe strength.

26. The connection of claim 25, further comprising:
The intermediate portion being formed cylindrically.

27. A pipe connection having a box (1) with an internal thread (2) formed with a lead (3) for mating with a pin (11) having an external thread (12) formed with a lead (13), a pin face (14), and a negative load flank (18), the box being swaged outwardly on an end of the pipe (44), the box having a face (39) and an upper portion (32) formed with tapered box threads (29), the swage having a lower portion (43) the box thread having a thread run-out (45) near the inner diameter, the connection having a pipe axis (25), a pin thread stab flank (70), a pin thread crest (90), a pin intermediate surface (74) between the crest and flank, a box thread stab flank (71), a box thread crest (91), and a box intermediate surface (75) between the box crest and flank, contact between the pin and the box threads when stabbed, being at a mutual contact point (22), a tangent line (23) extending through the mutual contact point, and a force vector (24) extending through the contact point perpendicular to the tangent line, a pressure angle (92) measured between the pipe axis and the force vector, the mating threads being sized for diametrical interference when assembled together, comprising:
The pin thread lead being made shorter than the box thread lead sufficiently to offset axial elongation of the pin thread and axial contraction of the box thread in accord with Poissons's Ratio for the pipe material, that occur during assembly of the pin with the box, such that the leads of the mating threads are substantially equal after being when assembled together;
The difference in leads being substantially equal to the diametrical interference of the threads, divided by the mean thread diameter, multiplied by Poisson's Ratio for the thread material, and divided by the number of threads per unit length;
Pin thread leads between the pin face and pin mid-length, being formed an additional length shorter than the mating box thread lead such that upon assembly, the difference in lead in combination with the negative load flanks is sufficient to effect an axial tension load in the pin between the pin face and the pin mid-length;
The tension load magnitude, in combination with the negative load flanks, being sufficient to preload and maintain the box load flanks against the mating pin load flanks, in sealing contact, against rated service loads;
Engaged box and pin threads tapering inwardly from the box face; the inner diameter being sized to provide radial width around the pipe bore sufficient to position a pin face having enough width to support pin threads and to withstand service loads;
The lower swage portion being formed such that engaged box and pin threads may extend substantially to the inner surface and there by provide a swaged connection strength that is selectively, between 75% and 100% of the pipe strength;
The threads being formed such that when the pin is stabbed into the box, the pressure angle can be no greater than 75 degrees.

* * * * *